(12) United States Patent
Lyle et al.

(10) Patent No.: US 7,143,317 B2
(45) Date of Patent: Nov. 28, 2006

(54) COMPUTER EVENT LOG OVERWRITING INTERMEDIATE EVENTS

(75) Inventors: Stephen B. Lyle, Granite Bay, CA (US); Paul Henry Bouchier, Little Elm, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 10/454,036

(22) Filed: Jun. 4, 2003

(65) Prior Publication Data

US 2004/0250182 A1    Dec. 9, 2004

(51) Int. Cl.
*G06F 11/00* (2006.01)

(52) U.S. Cl. .................... 714/45; 714/20; 710/53; 710/54

(58) Field of Classification Search ............... 714/20, 714/45; 710/53, 54
See application file for complete search history.

(56) References Cited

U.S. PATENT DOCUMENTS

| | | | |
|---|---|---|---|
| 5,790,427 A | 8/1998 | Greer et al. | 364/556 |
| 5,907,716 A * | 5/1999 | Yoshimura | 710/54 |
| 6,243,836 B1 * | 6/2001 | Whalen | 714/45 |
| 6,493,837 B1 * | 12/2002 | Pang et al. | 714/45 |
| 6,671,830 B1 * | 12/2003 | Kaler et al. | 714/39 |
| 6,684,343 B1 * | 1/2004 | Bouchier et al. | 714/4 |
| 6,782,461 B1 * | 8/2004 | Lam | 711/170 |
| 2002/0162055 A1 * | 10/2002 | Kurooka et al. | 714/45 |
| 2003/0074530 A1 * | 4/2003 | Mahalingaiah et al. | 711/117 |

* cited by examiner

*Primary Examiner*—Robert Beausoliel
*Assistant Examiner*—Yolanda L. Wilson (57) ABSTRACT

A service processor for a server system includes an event log that, once full, stores recent events by overwriting events of intermediate age so that the information required to diagnose both cascade errors and hangs are preserved. This contrasts with bottom-up buffers that discard recent events when full and with circular buffers that discard the oldest events when full. The event log can be reset by moving an exception region, that is, a region that is not overwritten by recent events. Alternatively, a partial reset can initialize an exception region (e.g., a bottom-up sublog), while a circular region or sublog continues to operate without being reset.

14 Claims, 8 Drawing Sheets

COMPUTER EVENT LOG OVERWRITING INTERMEDIATE EVENTS

BACKGROUND OF THE INVENTION

The present invention relates to computers and, more particularly, to computers that use event logs for diagnostic purposes. The present invention provides an improved event log that better uses limited capacity to retain events of greatest interest.

Much of modern progress is associated with the increasing prevalence of computer and network technology in society. Due to the complexity of computers and networks, errors are inevitable. Accordingly, diagnostic tools are continuously developed to address these errors. In the case of personal computers, an encountered error can be reported to a user when it occurs. For example, a message can be presented to the user, perhaps suggesting corrective action.

On the other hand, computers used as network and Internet servers are not typically attended by users. Accordingly, detected errors are typically compiled by a service processor that logs the errors (and other significant events) in an event log. When the computer is serviced, e.g., after some problem or failure, the event log can be examined to help determine the cause of the problem or failure.

One standard form of event log stores events until the log capacity is filled. Once full, it stops accepting events for logging. In other words, it favors old events over recent events for retention. Such an event log works well for error events that trigger a cascade of other error events. For example, an error event associated with the failure of a network port would be followed by a large number of detections of a failed network port. Error events that are reported after the log is full are discarded. However, the error events associated with the original failure are retained.

However, it is possible that a log would be full before the original error of interest occurs, in which case, that error would not be retained and would not be available for diagnoses. Also, in many cases, late reported errors are of interest. For example, in the event of a computer failure (e.g., "hang"), the last error or last few errors would be of greatest interest. So a system that makes these the least likely to be retained would not be optimal.

The likelihood of overflows can be reduced by using event logs with greater capacity. However, integrated-circuit real estate is limited so that it is not practical to use an event log that is large enough to store all possible events of interest. Also, no matter how great the log capacity, the problem of overflow must be addressed. One seemingly cost-effective approach to increasing effective log capacity is archive of logged events prior to a reset of the event log. Thus, as the event log approaches its capacity limits, its contents are written to hard disk; then the log can be emptied, ready to accept new events. However, archiving normally requires software running on a user processor—and there is no guarantee that it will be installed or properly maintained by the user. Another approach is to reset without archiving—but there is always a risk that the reset will delete events of interest.

In a prior-art approach implemented in a HP9000 K-Class design by Hewlett-Packard Company in some of its servers, a "circular" event log is used. Once the event log is full, new events overwrite the oldest events in the log. This works well for errors that hang a computer, but not so well for events that trigger a cascade of error events. If there are enough follow-on events, the trigger event(s) could be discarded and unavailable for diagnoses. To make it less likely that critical events will be discarded, a second circular log that only retains "severe" errors is used. This can be wasteful as many errors are entered into both logs. Furthermore, there is still the possibility of the severe event log being filled when a cascade of errors occur. What is needed is an improved event log system.

SUMMARY OF THE INVENTION

The present invention provides for an event log that discards events of intermediate age in favor of older or newer events. In other words, the invention provides a circular log that "excepts" a series of oldest events from overwriting when the log is full. Instead, the oldest un-excepted events are overwritten when the log is full.

Preferably, the invention is implemented as a unified log so that no events are subjected to (wasteful) double entry. In this case, the log can be effectively partially reset by moving the excepted region (but not its contents) of the log. Alternatively, the invention can be implemented using a combination of a bottom-up sublog and a circular sublog. In this case, a partial reset can be achieved by initializing the bottom-up sublog.

The invention further provides for a log manager that dedicates an "oversize" address space to a circular log (or sublog). When the circular log is first filled, log locations are overwritten cyclically, but each time a log location is overwritten it is assigned a different address. If system-management software attempts to access an address that is not currently assigned to a log location, a "not available" indication is returned. This can serve as a warning to the system-management software that previously-logged events have been overwritten.

The invention addresses both the cascade-type and the hang-type errors. The cascade-type errors are addressed since the oldest events are retained in the log. The hang-type errors are addressed as the most-recent errors are also retained. Partial resets reduce the risk of the lost of critical entries by retaining recently stored events. Of course, the invention can be further optimized by archiving logged events before they are overwritten. These and other features and advantages of the invention are apparent from the description below with reference to the following drawings.

DETAILED DESCRIPTION

Figure 1:
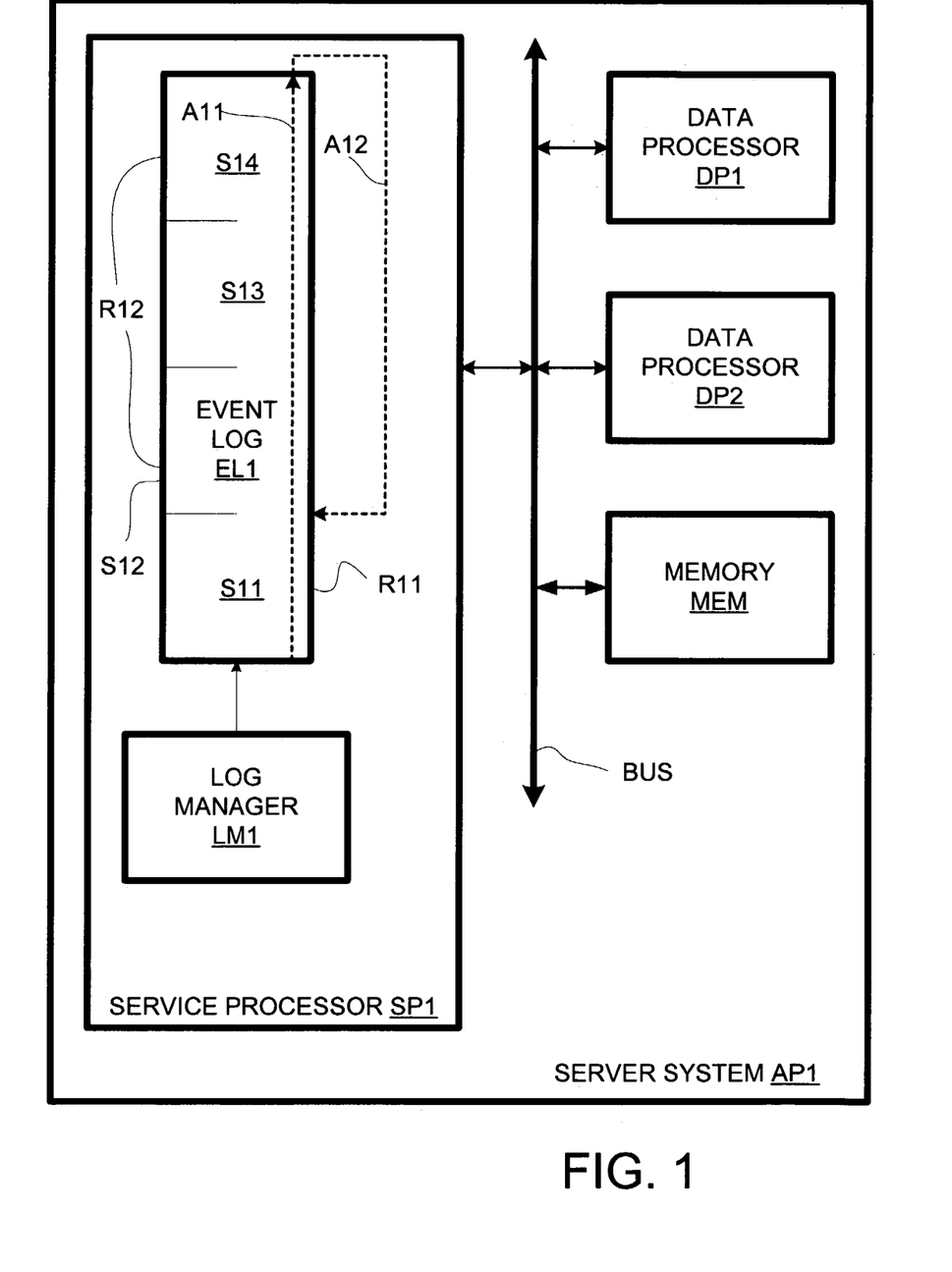
FIG. 1 is a schematic diagram of a computer system in accordance with the present invention.

A computer network server AP1 comprises data processors DP1 and DP2, memory MEM, and a service processor SP1, all connected via a system bus BUS, as shown in FIG. 1. Service processor SP1 gathers event reports generated by the other components of server AP1 and records them. To this end, service processor SP1 includes an event log EL1 and a log manager LM1. Event log EL1 has capacity for 1024 events; it is illustrated in FIG. 1 as having four sections S11–S14 for storing 256 events each.

Figure 2:
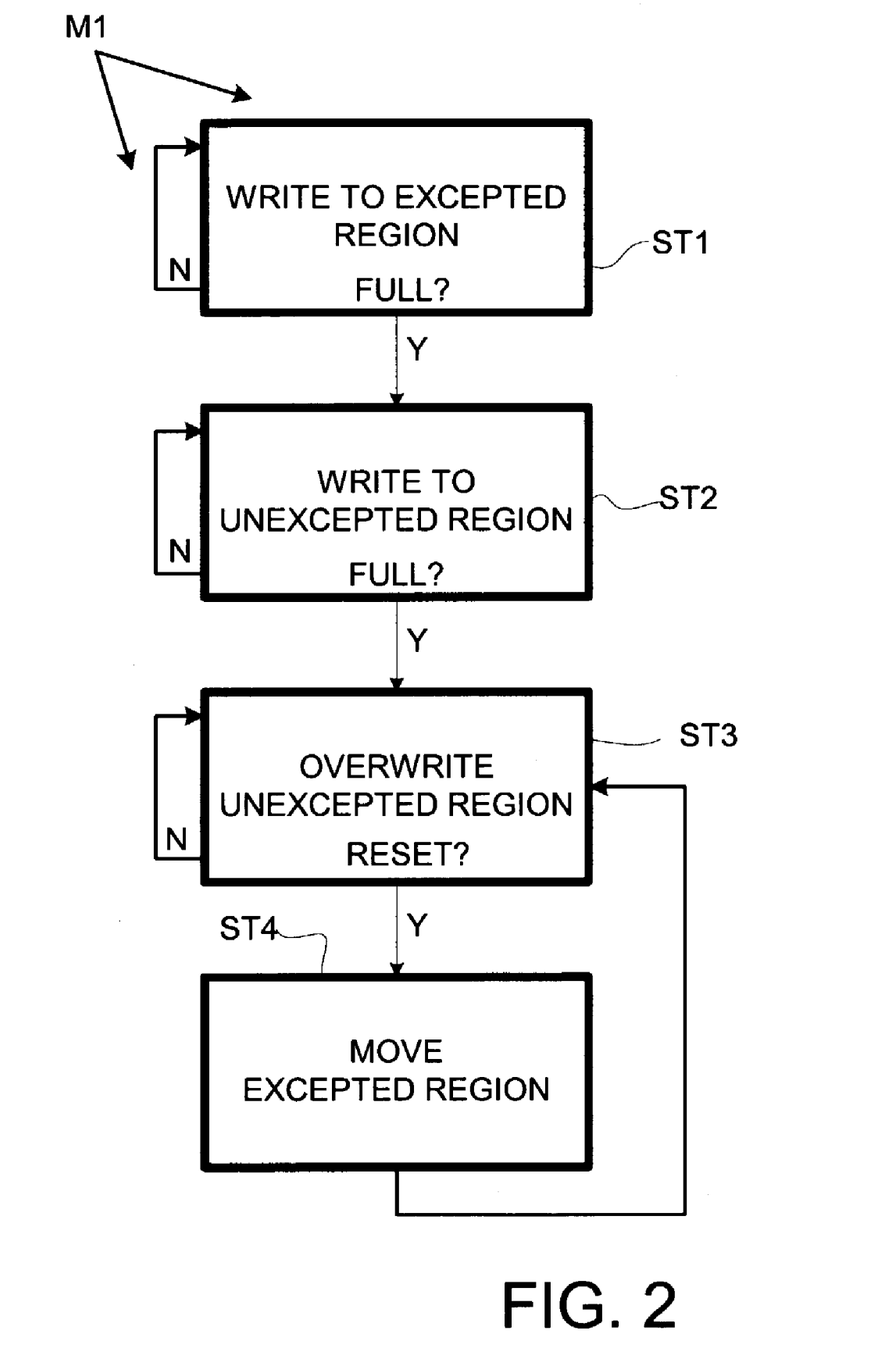
FIG. 2 is a flow chart of an event-log method implemented using the system of FIG. 1.

Service processor SP1 implements a log method M1, flow charted in FIG. 2. At step ST1, the first events are stored bottom up in an excepted region R11, which is coextensive with section S11 in FIG. 1. New events are added in succession to excepted region R11 until it is full.

Step ST2 begins once excepted region R1 is full. After that time, further events are added bottom up to an unexcepted region R12, which is coextensive with sections S12–S14 in FIG. 1. Events continue to be written to unexcepted region R12 until it is full. Note that step ST1 and ST2 are collectively represented by an upward arrow A11 in FIG. 1.

Once unexcepted region R12 is full, further events cause unexcepted region R12 to be overwritten bottom up. The transition from step ST2 to ST3 is indicated by a return arrow A12. During step ST3, unexcepted region R12 functions as a circular event log.

Step ST3 continues until there is some form of reset. Log manager LM1 is designed to trigger a reset as a function of time and severity of events. Depending on programming, the reset can take various forms.

Figure 3:
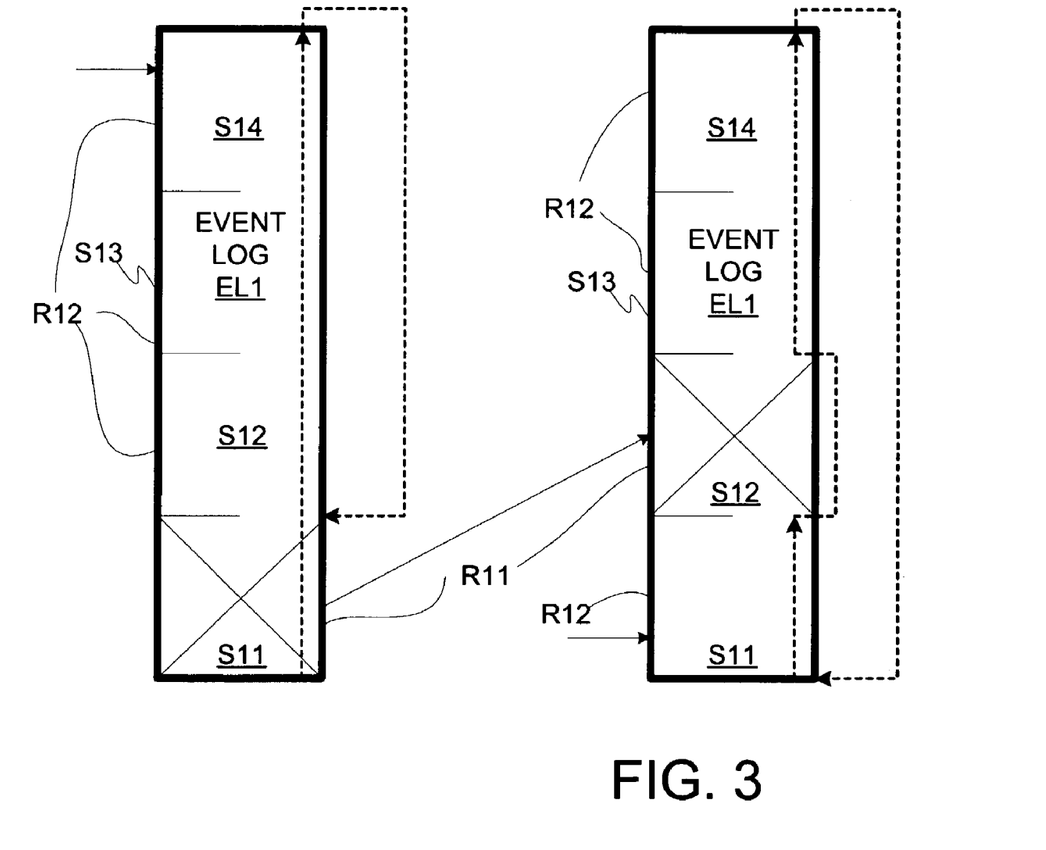
FIG. 3 is a progression diagram showing an approach to partially resetting an event log of FIG. 1.

In the illustrated variant of method M1, the reset takes the form of a move of the excepted region at step ST4. FIG. 3 illustrates a move of excepted region R11 from section S11 to section S12. For example, if an event of special interest is written to section S12 during step ST3, log manager LM1 can move excepted region from section S11 to section S12. Then when the log entries cycle from section S14, they cycle to section S11 instead of section S12. Once the log entries cycle through section S11, they skip excepted region S11 (now coextensive with section S12) and continue with section S13. More generally, excepted region R11 can move from any section S11–S14 to any other section as dictated by log manager LM1.

An advantage of resetting by moving the excepted region is that, once step ST3 is reached, event log EL1 is always full of event information, like a circular buffer. Yet, selected events can be preserved for during multiple cycles through event log EL1. Furthermore, reset timing is not critical, as the excepted region can be moved any time the location being written to is not in either the source or destination section for the excepted region. In an alternative variant, depending on programming, log manager LM1 can reinitialize event log EL1 so that method M1 returns to step ST1.

Figure 4:
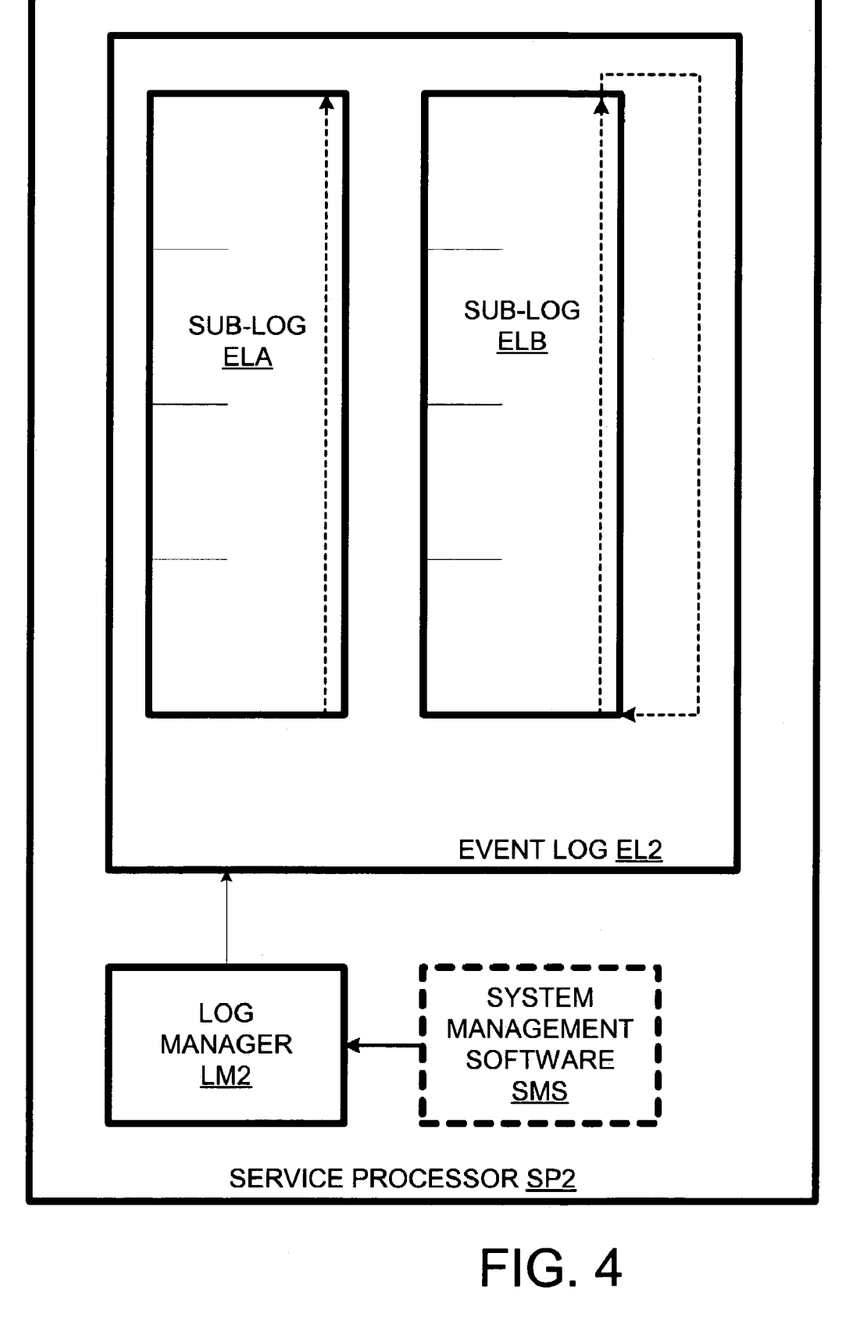
FIG. 4 is a schematic diagram of an alternate event log in accordance with the present invention.

A second service processor SP2 incorporating an event log EL2 in accordance with the invention is shown in FIG. 4. Event log EL2 includes two sublogs, a bottom-up sublog ELA and a circular sublog ELB. A log manager LM2 causes events can be entered into both sublogs ELA and ELB until bottom-up sublog ELA is full. Alternatively, log manager LM2 causes bottom-up event sublog ELA to be filled first, then circular sublog ELB is filled, overwriting as required to accept new events. Once sublog ELA is full, events are written to sublog ELB only until a reset. In this embodiment, bottom-up sublog ELA serves as a fixed excepted region, while circular sublog ELB serves as a fixed unexcepted region.

Figure 5:
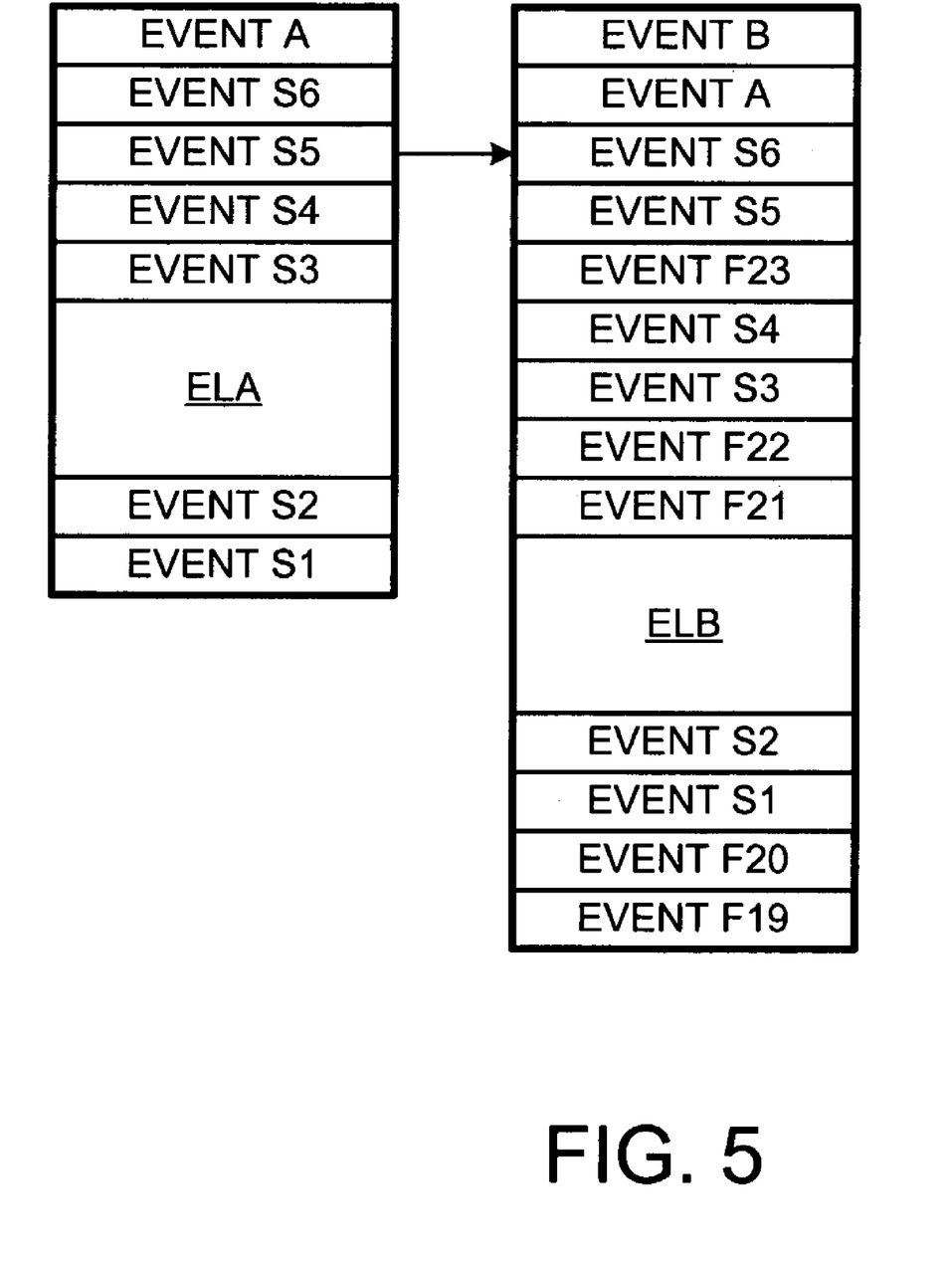
FIG. 5 is a schematic diagram of sublogs of the event log of FIG. 4 illustrating their differential selectivity.

Preferably, bottom-up sublog ELA is more selective than circular sublog ELB. Thus, as indicated in FIG. 5, circular sublog ELA stores all events (e.g., error events S1–S6 and Event A) that are stored in bottom-up sublog ELA plus additional events, e.g., forward-progress events F19–F23. When important event A occurs, it is logged into bottom-up sublog ELA and then copied by log manager LM2 to circular sublog ELB. (In FIGS. 5–8, reduced-size logs are used for explanatory purposes.) Note that the selectivity procedures can also be applied to the single log with moving excepted region of FIG. 1.

Figure 6:
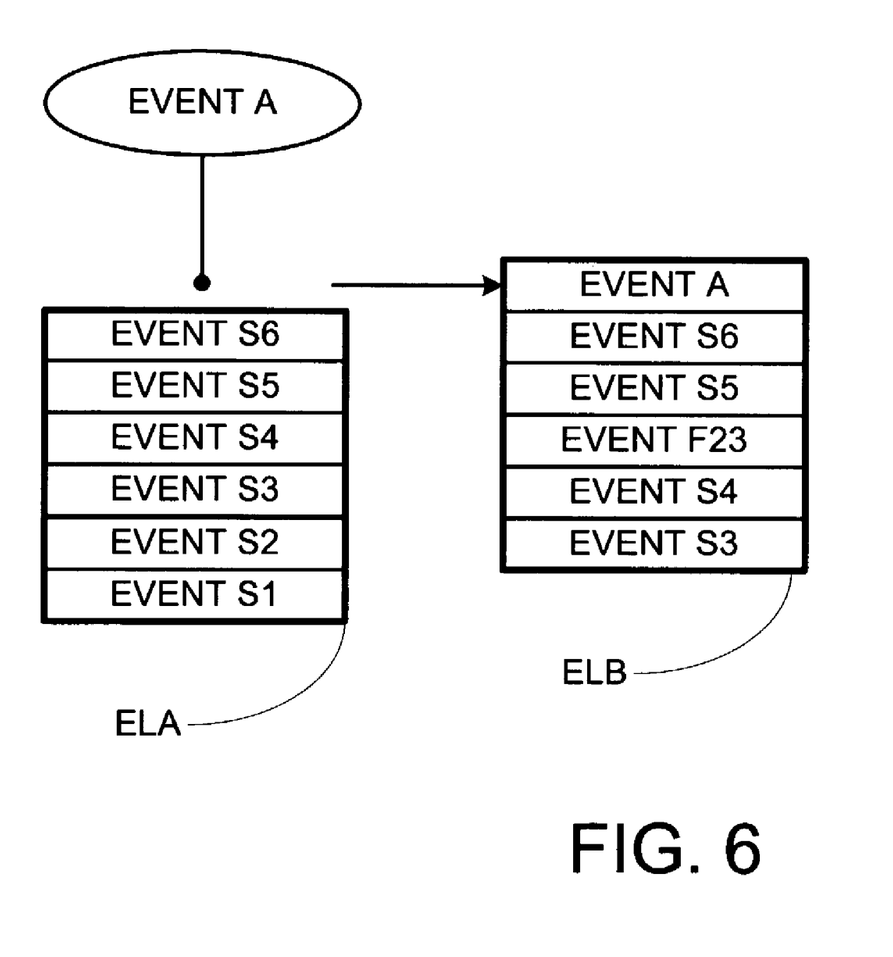
FIG. 6 is a schematic diagram of sublogs of the event log of FIG. 4 illustrating a "hang" case.

FIG. 6 illustrates the "hang" case for service processor SP2. When event A occurs, bottom-up sublog ELA is already full. With bottom-up sublog ELA full, the hang condition is still viewable in forward-progress sublog ELB. If bottom-up sublog ELA is not full, then the hang condition is viewable in both sublogs.

Figure 7:
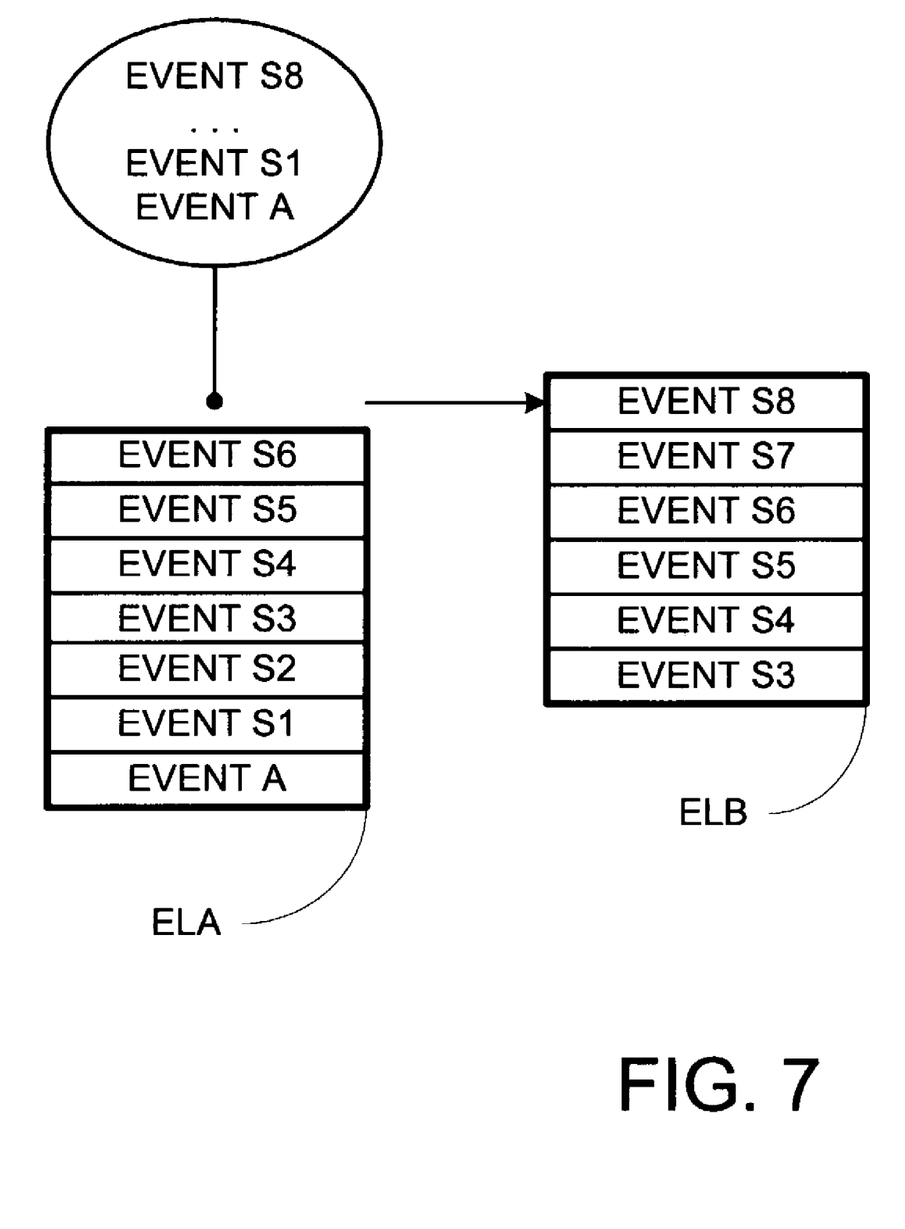
FIG. 7 is a schematic diagram of sublogs of the event log of FIG. 4 illustrating a "first-error" case.

FIG. 7 illustrates the "first-error" condition when a lot of logs are received. In this case, Event A is the important event that is followed by eight additional events S1–S8. The additional events fill bottom-up sublog ELA up to event S5. Events S6–S8 are not stored in sublog ELA. However, they are stored in forward-progress sublog ELB; resulting in events A, S1 and S2 being discarded from sublog ELB. In this case, the first error (event A) can be found in bottom-up sublog ELA.

Log manager LM2, which incorporates a baseboard management controller or "BMC", has an address space, part of which is assigned to each sublog. The part of the address space assigned to circular sublog ELB is much larger than the number of event locations in circular sublog ELB. In the illustrated case, the address space assigned to circular sublog ELB is four times the capacity of circular sublog ELB.

Figure 8:
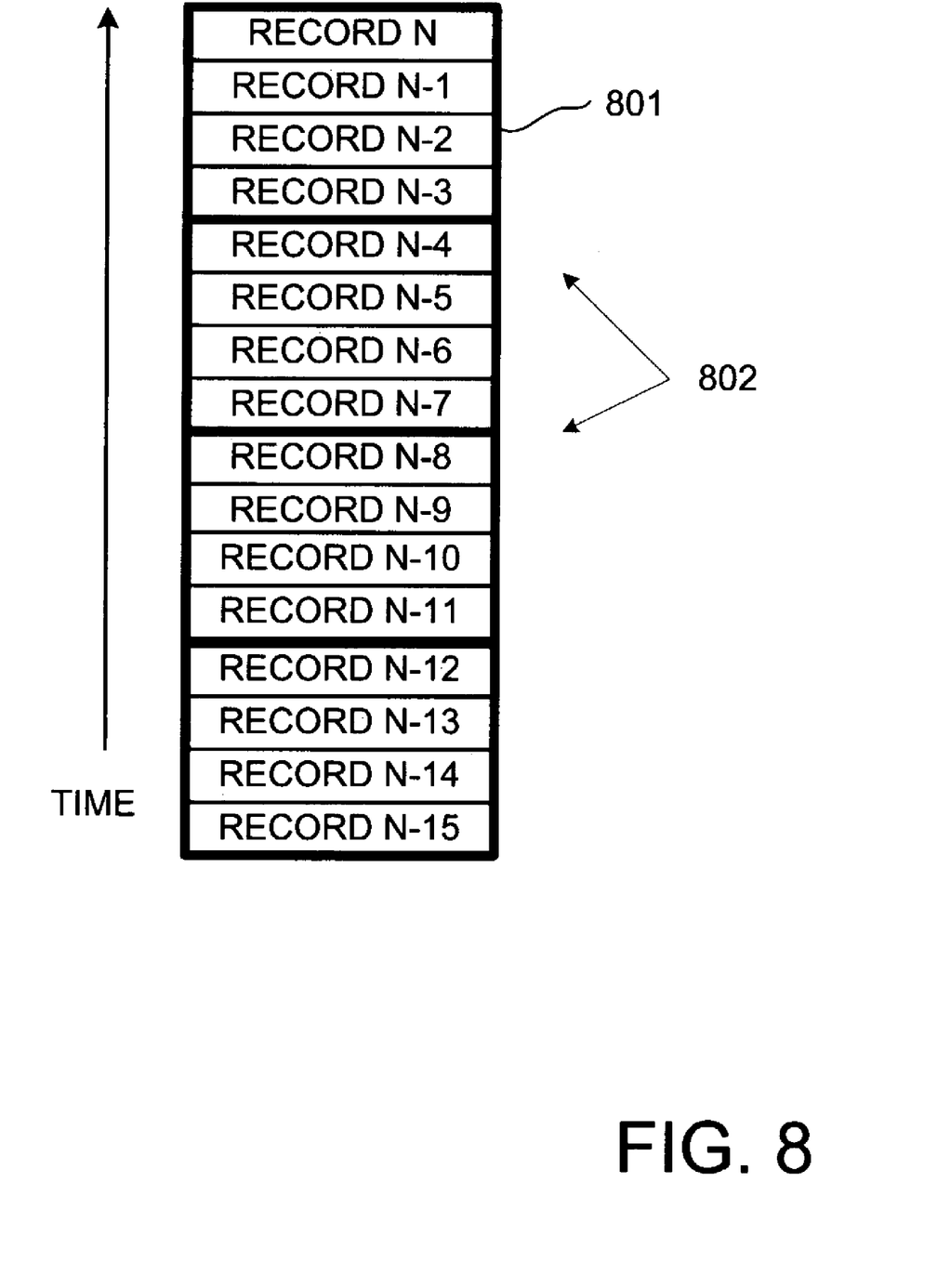
FIG. 8 is a schematic diagram of an address space that a log manager of the log of FIG. 4 can assigned to locations of a circular sublog.

FIG. 8 shows the relationship between the space 801 occupied at a given moment by circular sublog ELB and the entire address space 802 dedicated to circular sublog ELB. For expository purposes, the sizes are shown as 4 and 16, respectively. Records N-3 to N are addressable and available. Thus, if system management software SMS tries to access events stored at addresses N-3 to N, an event will be retrieved as expected. On the other hand, older events assigned to addresses N-13 to N-4 are addressable but not accessible (because they are no longer stored in circular sublog ELB. Thus, if system management software SMS tries to access events at addresses N-13 to N-4, a "not available" indication is returned.

System management software SMS can use the "not available" indications to determine when event information has been lost. For example, software SMS may be trying to transfer log information to hard disk by accessing addresses in order. A "not available" indication can be interpreted that events were logged faster than they could be transferred. Software SMS can then note that events were lost and start reading available addresses.

Log manager LM2 provides for partial and total resets. In a total reset, both sublogs ELA and ELB are initialized. In a partial reset, only bottom-up sublog ELA is initialized. In the latter case, events occurring just before a partial reset are preserved in circular sublog ELB for about one cycle through sublog ELB. Such recent events can be useful in indicating the cause of a hang, for example.

In service processor SP2, each event sublog is 512 events deep. Alternative event logs can have one event log bigger than the other. More generally, event logs and sublogs can be of various sizes. Also, the invention provides for sublogs or log sections with different degrees of selectivity. In other words, one sublog can store all reported events, while another stores only the most severe events.

Different reset strategies are provided for. An event log can be reinitialized, or reset on a per-section basis. The invention provides embodiments in which there can be more than one excepted region and in which the excepted regions can vary in size. While the invention applies generally to all systems that log events, the invention has particular applicability to systems that use the Intelligent Platform Management Interface (IPMI) standard for event logging. These and other variations upon and modifications to the described embodiments are provided for by the present invention, the scope of which is defined by the following claims.

What is claimed is:

1. An event-log system comprising:
    an event log for recording events generated by a data-processing system;
    an event-log manager that, when said event log is full, retains oldest events stored in said event log while overwriting intermediate events with more recent events, said event log manager having an excepted region and an unexcepted region defined therein, said event-log manager storing said oldest events in said excepted region and storing said intermediated events and said recent events in said unexcepted region, said event-log manager storing events cyclically in said unexcepted region.

2. An event-log system as recited in claim 1 wherein said event-log manager can move said excepted region and said unexcepted region so that said oldest events stored in said excepted region before said move are then in said unexcepted region so that they can be overwritten by further recent events.

3. An event-log system comprising: an event log for recording events generated by a data-processing system; an event-log manager that, when said event log is full, retains oldest events stored in said event log while overwriting intermediate events with more recent events, said event log including a bottom-up sublog and a circular sublog.

4. An event-log system as recited in claim 3 wherein said event-log manager partially resets said event log by resetting said bottom-up sublog while not resetting said circular sublog.

5. An event-log system as recited in claim 3 wherein said event-log manager dedicates an address space to said circular sublog that is larger than the capacity of said circular sublog so that each event storage location of said event sublog is assigned different addresses at different times.

6. An event-log system as recited in claim 5 further comprising system-management software that asserts an address dedicated to said circular sublog, said system-management software, in the case it is informed said address is not currently assigned to an event-storage location in said circular sublog, determining that event logs have been sent to said circular sublog and have subsequently become inaccessible.

7. An event-log method for recording events generated by a data-processing system, said method comprising:
    filling an event log with old events and intermediate events, said event log having an excepted region and an unexcepted region, said old events being stored in said excepted region, said intermediate and recent events being stored in said unexcepted region, said recent events being written to said unexcepted region in a circular manner.

8. An event log method as recited in claim 7 further comprising:
    moving said excepted region and said unexcepted region so that said old events are in said unexcepted region; and
    overwriting said old events with said recent events while retaining intermediate events.

9. An event-log method for recording events generated by a data-processing system, said method comprising:
    filling an event log with old events and intermediate events, said event log having a bottom-up sublog and a circular sublog; and
    as recent events are received, retaining said old events in said bottom-up sublog and overwriting said intermediate events with said recent events in circular sublog.

10. An event-log method as recited in claim 9 further comprising partially resetting said event log by resetting said bottom-up sublog while not resetting said circular sublog.

11. An event-log method as recited in claim 9 further comprising system management software addressing logs within and without said circular log.

12. An event-log system as recited in claim 11 wherein said system management software determines whether event logs had been sent to the log and had subsequently become inaccessible due to being pushed out of the circular log before they had been read by SMS.

13. An event-log system comprising:
    a circular event log having a number of event log locations;
    a log manager for managing said circular event log, said log manager dedicating an address space to said circular event log manager with more addresses than said number of event log locations, said log manager assigning different addresses at different times to each of said event log locations.

14. An event-log system as recited in claim 13 further comprising system-management software that transmits addresses to said log manager, said log manager, when it receives an address dedicated to said circular event log but not currently assigned to one of said log locations, returning a "not available" indication to said software, said software using said "not available" indication to determine that an event formerly stored in said log has been overwritten by some more recent event.

* * * * *

UNITED STATES PATENT AND TRADEMARK OFFICE
CERTIFICATE OF CORRECTION

| | | |
|---|---|---|
| PATENT NO. | : 7,143,317 B2 | Page 1 of 1 |
| APPLICATION NO. | : 10/454036 | |
| DATED | : November 28, 2006 | |
| INVENTOR(S) | : Stephen B. Lyle et al. | |

It is certified that error appears in the above-identified patent and that said Letters Patent is hereby corrected as shown below:

In column 3, line 18, delete "R1" and insert -- R11 --, therefor.

In column 6, line 25, in Claim 9, after "events in" insert -- said --.

Signed and Sealed this

Twenty-second Day of December, 2009

David J. Kappos
*Director of the United States Patent and Trademark Office*